US010365996B2

(12) United States Patent
Gupta et al.

(10) Patent No.: US 10,365,996 B2
(45) Date of Patent: Jul. 30, 2019

(54) PERFORMANCE-AWARE AND RELIABILITY-AWARE DATA PLACEMENT FOR N-LEVEL HETEROGENEOUS MEMORY SYSTEMS

(71) Applicant: Advanced Micro Devices, Inc., Sunnyvale, CA (US)

(72) Inventors: Manish Gupta, San Diego, CA (US); David A. Roberts, Boxborough, MA (US); Mitesh R. Meswani, Austin, TX (US); Vilas Sridharan, Boxborough, MA (US); Steven Raasch, Boxborough, MA (US); Daniel I. Lowell, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 46 days.

(21) Appl. No.: 15/331,270

(22) Filed: Oct. 21, 2016

(65) Prior Publication Data

US 2017/0277441 A1    Sep. 28, 2017

Related U.S. Application Data

(60) Provisional application No. 62/312,760, filed on Mar. 24, 2016.

(51) Int. Cl.
*G06F 12/00* (2006.01)
*G06F 12/02* (2006.01)
(52) U.S. Cl.
CPC .................... *G06F 12/02* (2013.01)

(58) Field of Classification Search
CPC .... G06F 3/0685; G06F 3/0605; G06F 3/0647; G06F 3/0649; G06F 12/02; G06F 12/0246
See application file for complete search history.

(56) References Cited

U.S. PATENT DOCUMENTS

| 8,775,368 B1* | 7/2014 | Burke ............... G06F 17/30233 707/609 |
| 9,201,751 B1* | 12/2015 | Muthirisavenugopal .................... G06F 17/30233 |
| 2014/0136782 A1* | 5/2014 | Thomas ............ G06F 17/30115 711/117 |
| 2014/0189196 A1* | 7/2014 | Kelkar .................... G06F 12/16 711/102 |

(Continued)

OTHER PUBLICATIONS

Kim et al., "Balancing Reliability, Cost, and Performance Tradeoffs with FreeFault", 2015, IEEE; all (Year: 2015).*

(Continued)

*Primary Examiner* — Arvind Talukdar
(74) *Attorney, Agent, or Firm* — Volpe and Koenig, P.C.

(57) ABSTRACT

Techniques for selecting one of a plurality of heterogeneous memory units for placement of blocks of data (e.g., memory pages), based on both reliability and performance, are disclosed. A "cost" for each data block/memory unit combination is determined, based on the frequency of access of the data block, the latency of the memory unit, and, optionally, an architectural vulnerability factor (which represents the level of exposure of a particular memory data value to memory faults such as bit flips). A memory unit is selected for the data block for which the determined cost is the lowest, out of all memory units considered, and the data block is placed into that memory unit.

16 Claims, 4 Drawing Sheets

(56) References Cited

U.S. PATENT DOCUMENTS

2015/0113203 A1* 4/2015 Dancho ............ G06F 3/0616
711/102

OTHER PUBLICATIONS

Chandy et al., "Reliability tradeoffs in personal storage systems", 2007, ACM SIGOPS Operating Systems Review, pp. 37-41 (Year: 2007).*

Nayanan et al. "Migrating Server Storage to SSDs: Analysis of Tradeoffs", 2009, ACM, pp. 145-158 (Year: 2009).*

Mukherjee et al."A systematic Methodology to Compute the Architectural Vulnerability Factors for a High-Performance Microprocessor", 2003, IEEE (Year: 2003).*

Li et al., "Online Estimation of Architectural Vulnerability Factor for Soft Errors", 2008, IEEE, pp. 341-352 (Year: 2008).*

"Memory Devices", 2015, tutorialspoint, retrieved from: https://web.archive.org/web/20151118185555/https://www.tutorialspoint.com/computer_logical_organization/memory_devices.htm (Year: 2015).*

Lameter, "Page Migration", 2015, retrieved from: https://web.archive.org/web/20150917005710/https://www.kernel.org/doc/Documentation/vm/page_migration (Year: 2015).*

Sieber, "How to Copy Data From a Laptop", 2013, retrieved from: https://www.makeuseof.com/tag/how-to-copy-data-from-a-laptop/ (Year: 2013).*

Biswas, A. et al., "Computing Architectural Vulnerability Factors for Address-Based Structures", Proceedings of the 32nd Annual International Symposium on Computer Architecture, Jun. 4-8, 2005, pp. 532-543, IEEE Computer Society, Madison, WI, USA.

Mukherjee, S. et al., "A Systematic Methodology to Compute the Architectural Vulnerability Factors for a High-Performance Microprocessor", Proceedings of the 36th Annual International Symposium on Microarchitecture, Dec. 3-5, 2003, 12 pgs., IEEE Computer Society, San Diego, CA, USA.

Walcott, K. et al., "Dynamic Prediction of Architectural Vulnerability from Microarchitectural State", Proceedings of the 34th Annual International Symposium on Computer Architecture, Jun. 9-13, 2007, pp. 516-527, ACM, San Diego, CA, USA.

Meswani, M. et al., "Heterogeneous Memory Architectures: A HW/SW Approach for Mixing Die-stacked and Off-package Memories", Proceedings of the 21st International Symposium on High Performance Computer Architecture, Feb. 7-11, 2015, pp. 1-11, IEEE, San Francisco, CA, USA.

Sridharan, V. et al., "A Study of DRAM Failures in the Field", Proceedings of the International Conference on High Performance Computing, Networking, Storage and Analysis, Nov. 10-16, 2012, pp. 1-11, IEEE, Salt Lake City, UT, USA.

Nair, P. et al., "FaultSim: A Fast, Configurable Memory Reliability Simulator for Conventional and 3D-Stacked Systems", ACM Transactions on Architecture and Code Optimization, Jan. 2016, pp. 44-1 to 44-24, vol. 12, Issue 4, Article No. 44, ACM, New York, NY, USA.

Sim, J. et al., "Transparent Hardware Management of Stacked DRAM as Part of Memory", Proceedings of the 47th Annual International Symposium on Microarchitecture, Dec. 13-17, 2014, pp. 13-24, IEEE, Cambridge, UK.

* cited by examiner

US 10,365,996 B2

PERFORMANCE-AWARE AND RELIABILITY-AWARE DATA PLACEMENT FOR N-LEVEL HETEROGENEOUS MEMORY SYSTEMS

CROSS-REFERENCE TO RELATED APPLICATION

The present application claims priority to U.S. Provisional Application No. 62/312,760, filed Mar. 24, 2016, and entitled "Reliability-Aware Control of Heterogeneous Memories," the entire contents of which are incorporated by reference as if fully set forth herein.

BACKGROUND

Computer devices include processing units that store and retrieve data in memory. Computing devices may incorporate multiple memory units with different performance characteristics (e.g., latency and/or bandwidth). Computer systems typically place data in a memory unit with the best performance characteristics available. However, such a scheme may not always be desirable.

BRIEF DESCRIPTION OF THE DRAWINGS

A more detailed understanding may be had from the following description, given by way of example in conjunction with the accompanying drawings wherein.

DETAILED DESCRIPTION

The present disclosure describes techniques for selecting one of a plurality of heterogeneous memory units for placement of blocks of data (e.g., memory pages), based on both reliability and performance. The techniques include determining a "cost" for each memory block/memory unit combination, based on the frequency of access of the data block ("hotness"), the latency of the memory unit, and, optionally, an architectural vulnerability factor (which represents the "vulnerability" or level of exposure of a particular memory data value to memory faults such as bit flips). The techniques then include selecting a memory unit for the data block for which the determined cost is the lowest, out of all memory units considered, and placing the data block into that memory unit.

Figure 1:
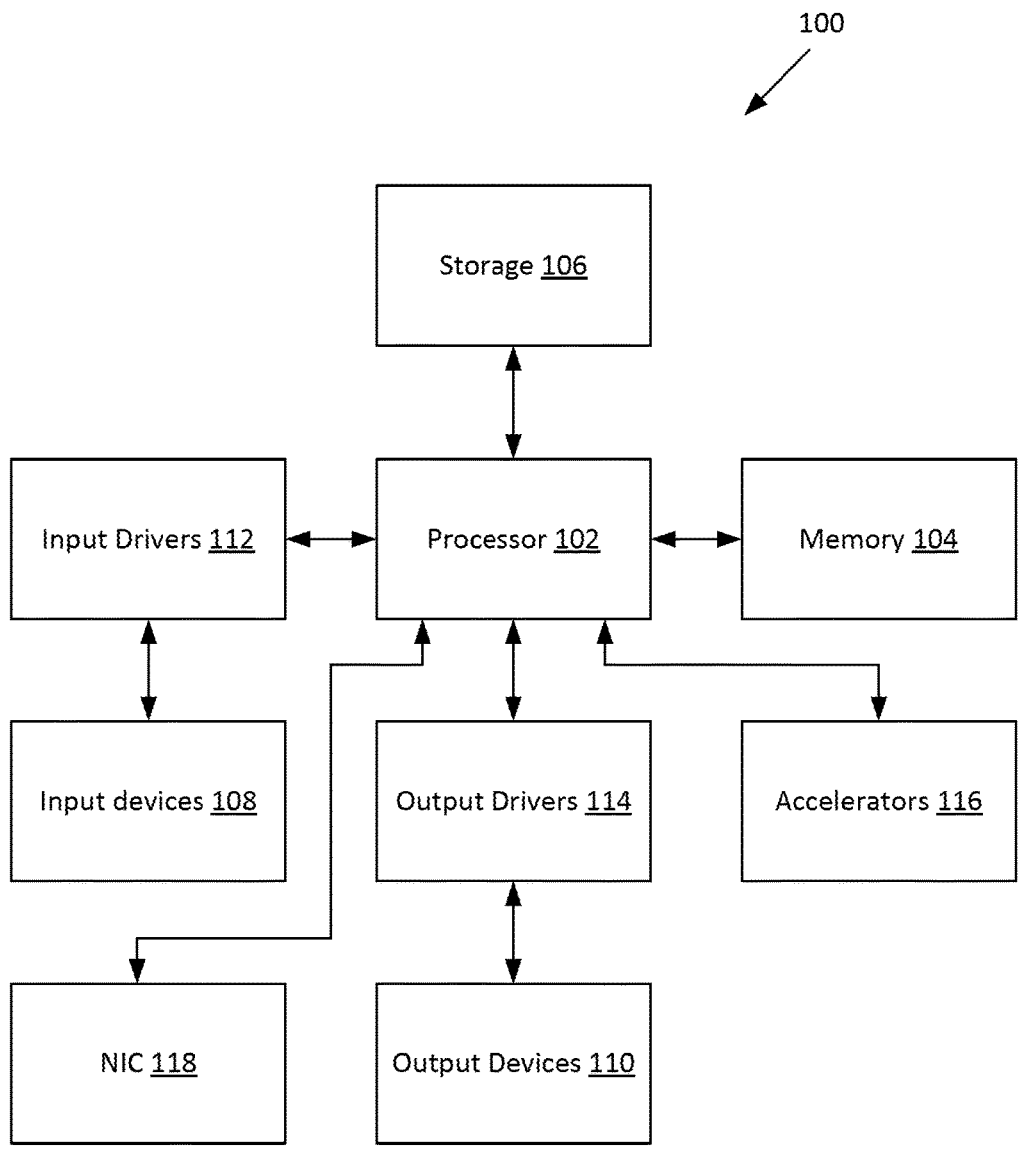
FIG. 1 is a block diagram of an example device in which aspects of the present disclosure are implemented.

FIG. 1 is a block diagram of an example device 100 in which aspects of the present disclosure are implemented. The device 100 includes, for example, a computer, a gaming device, a handheld device, a set-top box, a television, a mobile phone, or a tablet computer. The device 100 includes a processor 102, a memory 104, a storage device 106, one or more input devices 108, and one or more output devices 110. The device 100 may also optionally include an input driver 112 and an output driver 114. It is understood that the device 100 may include additional components not shown in FIG. 1.

The processor 102 includes one or more of: a central processing unit (CPU), a graphics processing unit (GPU), a CPU and GPU located on the same die, or one or more processor cores, wherein each processor core is a CPU or a GPU. The memory 104 may be located on the same die as the processor 102, or may be located separately from the processor 102. The memory 104 includes a volatile or non-volatile memory, for example, random access memory (RAM), dynamic RAM, or a cache.

The storage device 106 includes a fixed or removable storage, for example, a hard disk drive, a solid state drive, an optical disk, or a flash drive. The input devices 108 include one or more of a keyboard, a keypad, a touch screen, a touch pad, a detector, a microphone, an accelerometer, a gyroscope, or a biometric scanner. The output devices 110 include one or more of a display, a speaker, a printer, a haptic feedback device, one or more lights, or an antenna.

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110.

The network interface card ("NIC") 118 provides an interface to other devices via a computer network. The NIC 118 is configured to communicate with an external device via a networking protocol such as ethernet, wi-fi, InfiniBand, or other protocols. The accelerators 116 include one or more devices that are configured to accept and execute processing tasks. These devices include one or more of a graphics processing unit ("GPU"), field programmable gate array ("FPGA"), processing-in-memory chip ("PIM"), application-specific integrated circuit ("ASIC"), or other device.

Computing devices, such as device 100, may include several different memory units with different performance and reliability characteristics, where performance includes aspects of memory access such as access time (latency) and reliability includes the ability of memory units to avoid errors in stored data (e.g., bit flip errors caused by cosmic rays, malfunctions in storage elements caused by age, or the like). For example, a first type of memory may include a synchronous dynamic random access memory ("SDRAM") that is within a physical computer chip that is distinct from the computer chip that includes the processor 102 and/or accelerators 116, and a second type of memory may include a different type of memory, such as a phase change type of memory, a high bandwidth type of memory such as hybrid memory cube type memory, or other types of memory, that is stacked with a die that includes the processor 102 and/or accelerators 116. The different type of memory is closer to the processor 102 and is thus accessed with less latency than the SDRAM, but the different type of memory has lower reliability than the SDRAM memory. Because of these differing performance and reliability characteristics, it is desirable to allow for selection of the memory unit in which data is placed based on a trade-off between reliability and performance. Although two types of memories are described in this example, the computing device 100 may include any number of different types of memory units, with differing performance and reliability characteristics.

Figure 2:
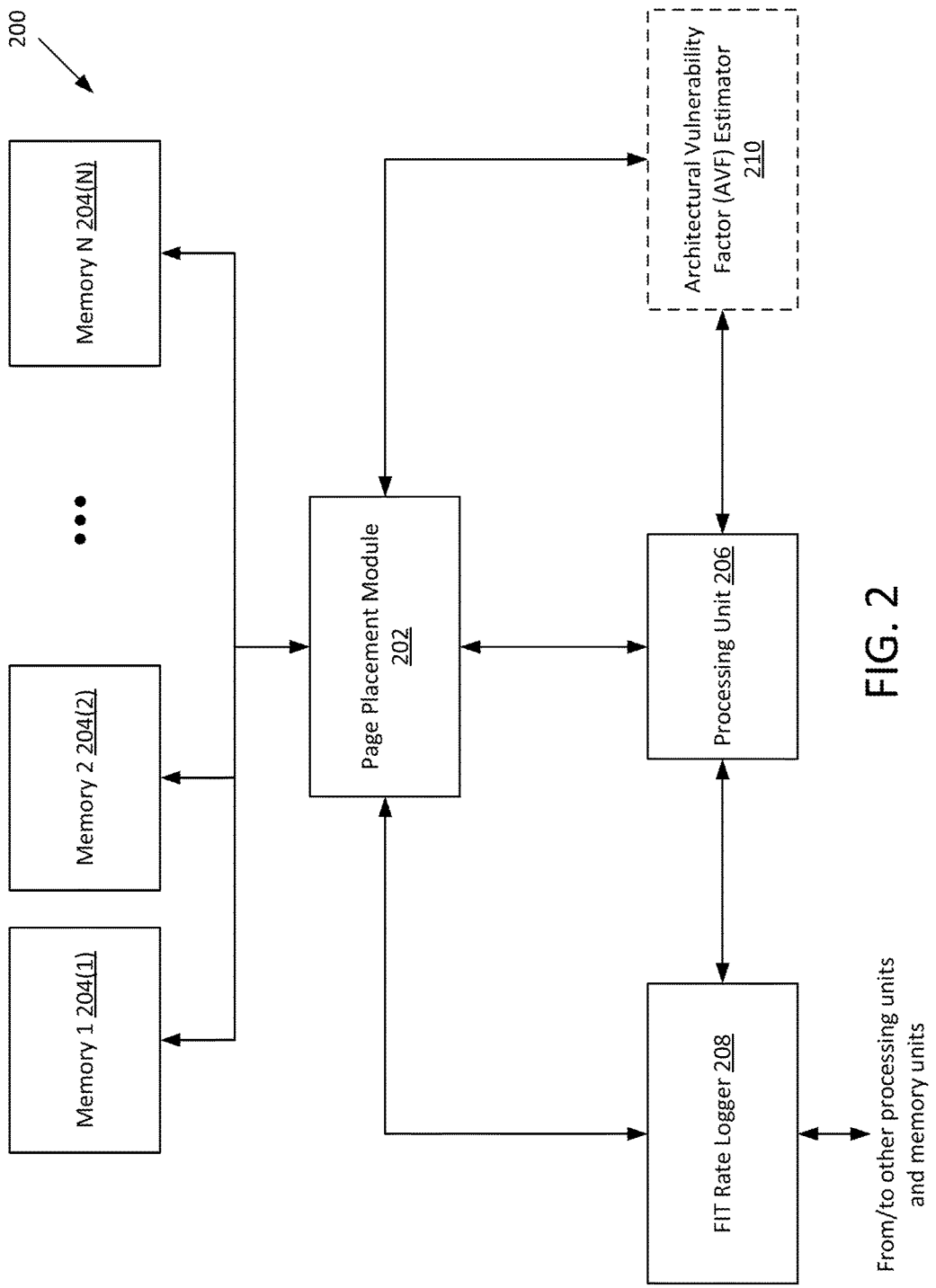
FIG. 2 is a block diagram of a memory page placement system for distributing memory pages in several different memory units, according to an example.

FIG. 2 is a block diagram of a memory page placement system 200 for distributing memory pages in several different memory units 204, according to an example. In various examples, the memory units 204 include one or more of a die-stacked memory (e.g., stacked on the same die as a die in which the processor 102 or accelerators 116 reside) or an off-die (e.g., not stacked with the die including the processor 102 or accelerators 116) SDRAM memory (such as, for example, memory 104. The memory units 204 alternatively or additional include any memory available for access by the processor 102 and/or accelerators 116, or any other processing units included in the device 100.

As shown, the memory page placement system 200 includes a page placement module 202, a failure-in-time ("FIT") rate logger 208, and, optionally, an architectural vulnerability factor estimator 210. The page placement module 202 is configured to place memory pages among various memory units 204 based on certain characteristics of the memory pages. The characteristics are related, at least in part, to the failure rates of the memory units 204 (including the memory units 204 shown in FIG. 2 as well as memory units other than those shown in FIG. 2), and are optionally related to usage of the memory pages by the processing unit 206 and other processing units.

In some examples, the processing unit 206 is a central processing unit, such as the processor 102 illustrated in FIG. 1. In other examples, the processing unit 206 is an accelerated processing unit, a graphics processing unit, a field-programmable gate array, a processing-in-memory chip, an application specific integrated circuit, or another type of processor. In various examples, the page placement module 202, the FIT rate logger 208, and the architectural vulnerability factor estimator 210 are software that executes on the processing unit 206 or another processing unit, are hardware in communication with the processing unit 206 and memories 204, or is a combination of software executing on the processing unit 206 or on another processing unit 206 and hardware in communication with the memories 204 and the processing unit 206 and other processing units.

In some examples, the FIT rate logger 208 includes centralized software, hardware, or combination thereof, that executes on or is included within a centralized or dedicated computer system that receives failure rate data from various computer systems including memory units 204 into which the page placement module 202 can place memory pages. More specifically, in some examples, the memory page placement system 200 is a single computer system with standard components, such as a processor (e.g., the processing unit 206), one or more memories (e.g., the memory units 204), and the like, in which the page placement module 202 controls placement of memory pages among the memory units 204 available to the single computer system, including the memory units physically inside the single computer system, as well as other memory units available remotely, such as through remote direct memory access or the like. In some examples, multiple computer systems, such as computer systems for which memory units available remotely to the processing unit 206 shown in FIG. 2 are local, include instances of the memory page placement system 200. In such examples, the multiple computer systems communicate to share failure rate data for various memory units but independently place memory pages within various memory units available to the different computer systems.

The FIT rate logger 208 keeps track of failures in memory units 204 available to be read from and written to by the processing unit 206 and, optionally, other processing units in communication with the FIT rate logger 208. The data maintained by the FIT rate logger 208 includes at least indications of a failure rate of one or more of the memory units 204 as well as data indicating whether the failures could or could not be corrected, for example, by error correcting code ("ECC") mechanisms. The FIT rate logger 208 collects this information by requesting such information from an operating system executing on the processing unit 206 and from other processing units coupled to the FIT rate logger 208, as the operating systems typically receive notifications of memory failures from the memories 204 so that the operating systems can perform appropriate actions to handle such failures. In some examples, the data collected by the operating system includes indications of whether the fault could be corrected, and where the fault occurred (e.g., which physical address, which memory unit, column and row information, or the like).

The architectural vulnerability factor estimator 210 maintains indications of "vulnerability" of memory pages stored in the memory units 204 to errors. Vulnerability of memory pages to faults is defined based on the "exposure" of the memory pages to faults that actually occur. "Exposure" is dependent on the software being executed and means the likelihood or tendency of a memory fault to affect the execution state of software. The exposure is based on the time difference between when a write occurs in a memory unit and when a read occurs that reads the written value. If the time difference between a write and a read that reads the written value is long, then the page is exposed for a longer duration to faults.

Many techniques for determining the architectural vulnerability factor exist. Some example techniques are provided in the following publications, each of which is incorporated by reference herein in their entirety: "A Systematic Methodology to Compute the Architectural Vulnerability Factors for a High-Performance Microprocessor," S. Mukherjee et al, MICRO 36 Proceedings of the 36th Annual IEEE/ACM International Symposium on Microarchitecture, page 29, 2003; "Online Estimation of Architectural Vulnerability Factor for Soft Errors," Xiaodong Li, et al, Proceedings of the International Symposium on Computer Architecture, June 2008.

In operation, the page placement module 202 monitors the fault data from the FIT rate logger 208 and optionally the architectural vulnerability factor estimator 210 and identifies memory pages to migrate between memory units, if such memory pages exist. In response to identifying such pages, the page placement module 202 causes such memory pages to be migrated as identified. Memory pages to be migrated are identified based on a tradeoff of memory unit reliability, memory unit latency, and "hotness" of the memory pages. "Hotness" indicates the frequency with which the memory page is accessed (e.g., number of accesses per unit time). Reliability is related to the number of failures that occur per unit time and latency is the difference in time between when a memory access is requested and when the memory access occurs. In some example, the page placement module 202 detects when the hotness, latency, or reliability changes and determines an updated "cost" score for each memory page affected by the changes. Subsequently, the page placement module 202 determines whether the update cost scores indicate that any of the memory pages affected by the changes should be migrated from one memory unit 204 to another memory unit 204. Responsive to that determination, the page placement module 202 causes the memory pages to be migrated as indicated.

In one example technique for determining updated cost scores, the page placement module 202 determines updated cost scores for a memory page based on the following expression:

$$\text{Cost}_{Mi} = \alpha * \text{FIT}_{Mi} * \text{AVF}[\text{memory\_page}] - (1-\alpha) * (\text{Hotness}[\text{memory\_page}]/\text{latency}_{Mi})$$

where:

$cost_{Mi}$ is the cost score for a particular memory unit;

α is a tunable parameter that adjusts the relative importance of performance versus reliability in determining the cost;

AVF[memory_page] is the architectural vulnerability factor of the memory page;

Hotness[memory_page] is the frequency of access of the memory page (e.g., number of accesses per unit of time); and $latency_{Mi}$ is the latency of the memory unit being considered.

In another example, the architectural vulnerability factor estimator 210 is not included and the page placement module 202 determines the updated cost scores for a memory page based on the following expression:

$$Cost_{Mi}=\alpha*FIT_{Mi}-(1-\alpha)*(Hotness[memory\_page]/latency_{Mi})$$

As can be seen, the above expression is similar to the expression for determining updated cost scores when the architectural vulnerability factor estimator 210 is present, except that the term AVF[memory_page], which indicates the architectural vulnerability factor of a particular memory page, is absent.

The page placement module 202 determines cost scores for each memory unit being considered as a memory unit into which the memory page can be placed. The page placement module 202 then selects the memory unit associated with the lowest cost score as the memory unit to which the memory page should be migrated. If the lowest cost score is associated with the memory unit in which the memory page is already located, then the page placement module 202 does not cause the memory page to be migrated. If the lowest cost score is associated with a memory unit that is different than the memory unit in which the memory page is located, then the page placement module 202 causes the memory page to be migrated to that memory page. Although the "lowest" cost score is described as used for identifying the memory unit for placement of the memory page, this should be understood as simply one example of a technique for identifying a memory page. Alternatively, the highest cost score could be used, or any other means of identifying a particular cost out of all costs calculated could be used to identify a particular memory unit for placement of the memory page. In one example, the expressions for determining cost provided above are instead utilized in reciprocal form such that the lowest cost value instead becomes the highest cost value. For example, instead of using the expression:

$$Cost_{Mi}=\alpha*FIT_{Mi}*AVF[memory\_page]-(1-\alpha)*Hotness[memory\_page]/latency_{Mi},$$

the expression:

$$Cost_{Mi}=1/(\alpha*FIT_{Mi}*AVF[memory\_page]-(1-\alpha)*(Hotness[memory\_page]/latency_{Mi}))$$

is used.

The alpha parameter represents a relative importance of performance versus reliability. In other words, the alpha parameter can be tuned to control the degree to which the performance affects cost versus the degree to which reliability affects cost. In various examples, the alpha parameter is set manually by a user (e.g., by a selection through an operating system command or dialogue box), or automatically at the request of software, such as the operating system or an application. In some examples, multiple alpha parameters are used for different memory pages. In such examples, the alpha parameters may be set on a per-application basis, on a per-thread basis, on a per-process basis, or on any other basis, such that memory pages accessed by different applications, threads, or processes, have their costs evaluated with different alpha parameters.

An additional example expression for determining cost is as follows:

$$Cost_{Mi}=1/(\alpha*FIT_{Mi}*AVF[memory\_page]-(1-\alpha)*(Hotness[memory\_page]*(bandwidth_{Mi}/latency_{Mi})))$$

In the above expression, "bandwidth" is the bandwidth (e.g., rate of data transfer) between the processing unit executing the software that accesses the memory page and the memory unit at issue (Mi). Other expressions for cost that rely on any of the above values are also possible.

In various examples, the page placement module 202 checks whether to migrate memory pages periodically, according to a schedule, or in response to detecting one or more types of trigger events. In various examples, a trigger event occurs in response to the page placement module 202 receiving updated fault data from the FIT rate logger 208, in response to the page placement module 202 receiving updated architectural vulnerability factor data from the architectural vulnerability factor estimator 210, or in response to receiving both updated fault data and updated architectural vulnerability factor data. In some examples, the page placement module 202 limits the rate at which page migrations occur to prevent degradation of performance of the processing unit 206.

Although the term "memory page" is used herein as the unit of memory that can be migrated based on determined cost, other units of memory (generally referred to as data block or block of data herein) could instead be migrated based on determined cost. In general, the cost for any size memory portion can be determined based on performance and reliability characteristics, and then determinations can be made as to whether to migrate such memory pages based on the determined costs.

In some examples, the FIT rate logger 208 is pre-programmed with failure-in-time data. The failure-in-time data may specify different failure rates for different memory types. In other examples, the failure-in-time data is obtained by observing failures of each memory unit and deriving a failure rate based on the observed failures. Here, the observed failures mean failures of bit storage elements that either were able to be corrected or were not able to be corrected. The failure rate in this example is simply the number of such failures observed per unit of time. In yet another example, the failure rate is a "predicted" failure rate, where "predicted failure rate" means the predicted average time to complete failure of a memory unit, where complete failure means that a failure occurred that was not able to be corrected by error check code. An example FIT rate logger 208 for obtaining or generating a predicted failure rate is provided below with respect to FIG. 3.

Figure 3:
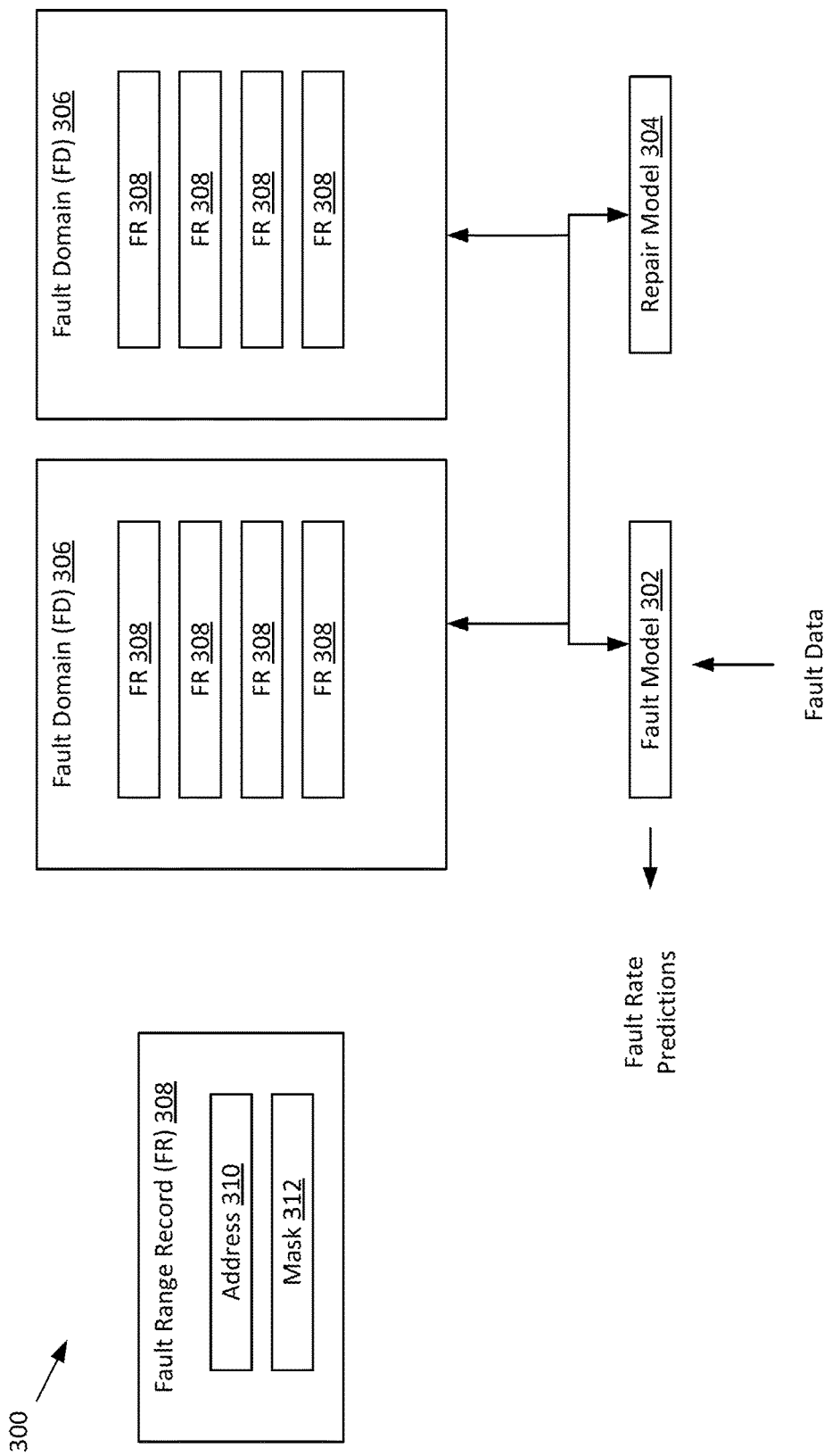
FIG. 3 is a block diagram of a failure-in-time ("FIT") rate logger, according to an example.

FIG. 3 is a block diagram of a FIT rate logger 300, according to an example. The example FIT rate logger 300 includes a series of components that operate together to store fault data, model memory faults, model error correcting code, and provide fault rate predictions for use by the page placement module 202.

The components of the FIT rate logger 300 include a fault model 302 and a repair model 304. The fault model 302 and repair model 304 interact with representations of the memory units 204 referred to as fault domains 306. The fault domains 306 include one or more fault range records 308, each of which indicates what portions of a memory unit 204 are associated with a memory fault. Each fault range record 308 includes an address 310 and a mask 312. The address 310 represents a location in a memory unit 204. The mask 312 acts as a wild card for the address. More specifically, both the address 310 and the mask 312 include the same number of bits. Each bit position in the mask 312 includes a wild card indicator. For example, a bit value of 1 in the mask 312 indicates that the corresponding bit in the address 310 can be either a 0 or a 1. A bit value of 0 in the mask 312 indicates that the bit value specified in the address 310 is associated with a fault. The combination of address 310 and mask 312 thereby acts as a way to specify a range of addresses in which faults have occurred.

The fault model 302 and repair model 304 work together to generate fault range records 308 by simulating fault occurrences and error correction. In general, the fault model 302 performs fault simulation iterations. The fault model 302 has data indicating different types of faults that may occur as well as the probability of each fault occurring. In each fault simulation iteration, the fault model 302 generates zero or more simulated faults based on the fault types and probability of each fault occurring. The fault types include faults that affect the memory units 204 in different ways.

Some example fault types include a row fault, a column fault, a word fault, a bit fault, and a bank fault. These different faults affect different sections of a memory unit 204. For example, a bit fault affects a single bit, a word fault affects a word, a row fault affects a row, a column fault affects a column, and a bank affects a whole bank of a memory unit 204.

After each fault simulation iteration, the repair model 304 determines whether faulting data can be recovered based on one or more modeled error correcting mechanisms. More specifically, error correcting mechanisms allow for correction of up to a certain number of bits of faulted data. To correct data, the error correcting mechanisms store additional bits of data. These additional bits of data may allow for correction of errors in a particular group of data, where "group of data" includes a logical collection of data, such as a word, column, row, bank, or the like. For example, a particular word of memory may include a certain number of additional error correcting bits that allow for correction of a certain number of errors in that word.

The repair model 304 thus determines whether enough faults have occurred in any particular set of locations such that the error correcting code is not able to correct at least one error. If all errors can be corrected, then the simulation proceeds with another simulation iteration. If at least one error cannot be corrected after the simulation iteration, then the simulation ends and fault model 302 determines a time to failure based on the total number of iterations that occurred before the error that could not be corrected occurred. In one example, the fault model 302 has data that indicates an amount of time intended to be represented by each simulation iteration and multiples the number of iterations that have occurred by that amount of time.

Each time the simulation ends, a single time-to-failure value is produced. The FIT rate logger 300 runs a Monte Carlo simulation to determine an average or predicted time-to-failure for any particular memory unit. To perform the Monte Carlo simulation, the FIT rate logger 300 runs multiple simulations and obtains simulation results (e.g., time-to-failure) for each simulation. The FIT rate logger 300 averages all of the results to obtain an expected time-to-failure for the memory unit.

In some examples, in performing a Monte Carlo simulation for a particular memory unit, the FIT rate logger 300 accepts, as input, identifications of storage elements of that memory unit that are already known to be permanently faulty. These identifications come directly from the memory units themselves and/or from one or more operating systems controlling the memory units. (Specifically, operating systems are typically informed by memory units when faults occur in the memory units.) With this knowledge of storage elements known to be faulty as a starting point, the FIT rate logger 300 simulates failures in other portions of the memory unit. The effect of the knowledge of faulty storage elements is to decrease the average time-to-failure as compared with a perfectly functioning memory unit (e.g., no faulty storage elements), since fewer additional faults are required before an uncorrectable fault occurs.

At the end of the simulation, the FIT rate logger 300 has generated an average time-to-failure. The FIT rate logger 300 converts this average time-to-failure to an average failure rate by taking the reciprocal of the average time-to-failure and multiplying by a time interval over which the failure rate is desired. This failure rate is used by the page placement module 202 to determine cost for a memory page/memory unit combination as described above.

Figure 4:
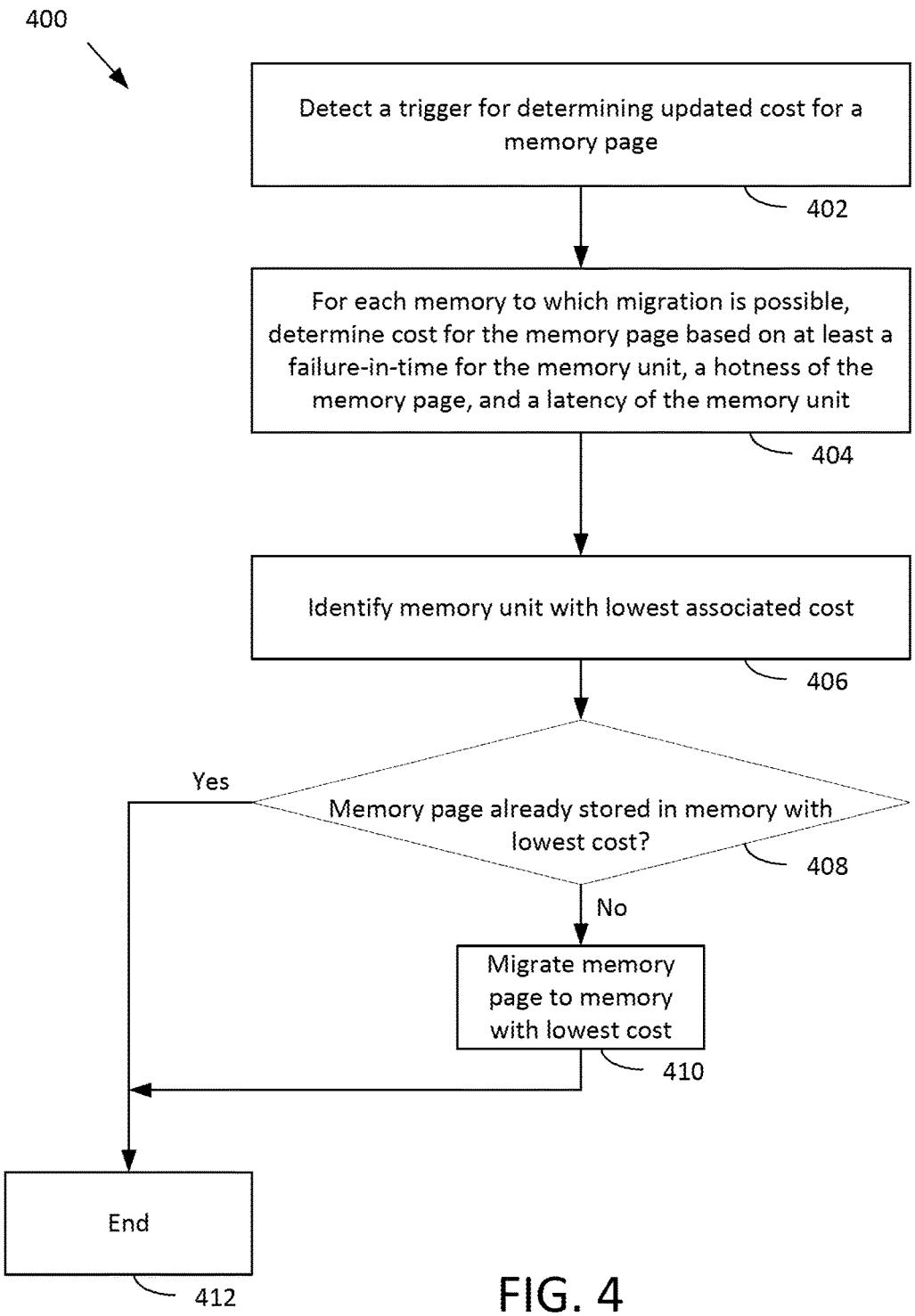
FIG. 4 is a flow diagram of a method for placing memory pages into one or more memory units based on a tradeoff between memory reliability and performance, according to an example.

FIG. 4 is a flow diagram of a method 400 for placing memory pages into one or more memory units based on a tradeoff between memory reliability and performance, according to an example. Although described with respect to the system shown and described with respect to FIGS. 1-3, it should be understood that any system configured to perform the method, in any technically feasible order, falls within the scope of the present disclosure.

The method 400 begins at step 402, where the page placement module 202 detects a trigger for determining an updated cost score for one or more memory pages. The trigger may include detecting that a periodic time interval has elapsed since the last periodic time interval, in a scheme in which the page placement module 202 determines updated cost scores for memory pages periodically. The trigger may also include receiving updated failure-in-time information from the FIT rate logger 208 and/or receiving updated architectural vulnerability factor data from the architectural vulnerability factor estimator 210. The page placement module 202 may limit the rate at which the page placement module 202 determines updated cost scores for memory pages. In such instances, the page placement module 202 proceeds past step 402 only if doing so would not exceed the limit on the rate at which the page placement module 202 determines updated cost scores for memory pages.

At step 404, for each memory unit (e.g., memory units 204 included within the computer system of the processing unit 206 or memory units remotely accessibly by the processing unit 206) to which migration of the memory page under consideration is possible, the page placement module 202 determines a cost for that memory. The cost is based on at least a failure-in-time for the memory unit, a hotness of the memory page, and a latency of the memory unit. The cost can be representative of the desirability of placing the memory page being analyzed into a particular memory unit, based on a trade-off between reliability of the memory unit and performance associated with the memory unit. Whether migration is possible to a particular memory unit is based on the capabilities of the computer system.

At step 406, the page placement module 202 identifies the memory unit, out of the memory units for which cost is determined at step 404, with the lowest cost. This memory unit represents the memory unit into which it is most "desirable" to place the memory page under analysis.

At step 408, the page placement module 202 determines whether the memory page is already stored in the memory unit with the lowest cost. If the memory page is not already stored in the memory unit with the lowest cost, then the method 400 proceeds to step 410, where the page placement module 202 causes the memory page to be migrated to the memory with the lowest cost. Migration can be accomplished by requesting the operating system (e.g., executing on the processing unit 206 or on another processor) to migrate the memory page. In response, the operating system copies the memory page from one memory to another and update any data structures for tracking the memory page (for example, page tables). After step 410, the method 400 proceeds to step 412 and ends. If, at step 408, the memory page is already stored in the memory unit with the lowest cost, then the page placement module 202 does not cause the memory page to be migrated and proceeds to step 412, where the method 400 ends.

In various examples, the method 400 is performed for each memory page for which placement according to a tradeoff between reliability and performance is desired. Such memory pages may include all memory pages in a system or a subset of memory pages designated by the operating system, by an administrator, or by some other user.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for identifying one memory unit, of a plurality of memory units, for storage of a block of data, the method comprising:
   generating failure rates for the plurality of memory units by:
      performing a plurality of fault simulations by performing a series of fault simulation iterations, each fault simulation iteration including simulating fault occurrences and error correction, and determining whether error correcting code is not able to correct at least one error,
      determining a time-to-failure value for each fault simulation by determining the number of fault simulation iterations that occur before an error could not be corrected and an amount of time representative of each fault simulation iteration, and
      determining the failure rates based on the time-to-failure values;
   determining, for the block of data, a plurality of costs, each cost corresponding to a different memory unit of the plurality of memory units, based on a comparison of the determined failure rates of the memory units to a combination of hotness values that indicate frequency of access of the block of data and latencies of the memory units;
   selecting a cost of the plurality of costs, the selected cost being either the highest of the plurality of costs or the lowest of the plurality of costs; and
   migrating the block of data to a memory unit of the plurality of memory units that is associated with the selected cost.

2. The method of claim 1, wherein the migrating comprises:
   responsive to determining that the block of data is not stored in the memory unit that is associated with the selected cost, migrating the block of memory to the memory unit that is associated with the selected cost.

3. The method of claim 1, wherein:
   the determining, selecting, and migrating steps are performed in response to one or more of a periodic time span elapsing, receipt of one or more reliability information updates for one or more memory units of the plurality of memory units, or receipt of a frequency of access information update for the block of data.

4. The method of claim 1, wherein:
   determining the plurality of costs is further based on an architectural vulnerability factor for the block of data, the architectural vulnerability factor comprising an indication of vulnerability of data in the block of data to memory faults.

5. The method of claim 1, wherein:
   determining the plurality of costs comprises evaluating the expression:

$$\text{Cost}_{Mi} = \alpha * \text{FIT}_{Mi} * \text{AVF}[\text{data\_block}] - (1-\alpha) * \text{Hotness}[\text{data\_block}]/\text{latency}_{Mi},$$

where:
   $\text{Cost}_{Mi}$ comprises the cost of a memory unit $M_i$;
   $\text{FIT}_{Mi}$ comprises a failure-in-time rate of the memory unit $M_i$;
   AVF[data_block] comprises an architectural vulnerability factor for the block of data;
   Hotness[data_block] comprises an indication of frequency of access of the block of data;
   Latency comprises latency of access of the memory unit $M_i$; and
   $\alpha$ comprises a tunable trade-off factor that indicates relative importance of performance and reliability.

6. The method of claim 5, wherein selecting the cost of the plurality of costs comprises selecting the lowest cost of the plurality of costs.

7. The method of claim 5, wherein a is associated with a specific computer process.

8. A computer system for identifying one memory unit, of a plurality of memory units, for storage of a block of data, the computer system comprising:
  a processing unit;
  a plurality of memory units coupled to the processing unit;
  a failure-in-time rate logger configured to generate failure rates for the plurality of memory units by:
    performing a plurality of fault simulations by performing a series of fault simulation iterations, each fault simulation iteration including simulating fault occurrences and error correction, and determining whether error correcting code is not able to correct at least one error,
    determining a time-to-failure value for each fault simulation by determining the number of fault simulation iterations that occur before an error could not be corrected and an amount of time representative of each fault simulation iteration, and
    determining the failure rates based on the time-to-failure values;
  a page placement module configured to:
    determine, for the block of data, a plurality of costs, each cost corresponding to a different memory unit of the plurality of memory units, based on a comparison of the determined failure rates of the memory units to a combination of hotness values that indicate frequency of access of the block of data and latencies of the memory units,
    select a cost, of the plurality of costs, the selected cost being either the highest of the plurality of costs or the lowest of the plurality of costs, and
    migrate the block of data to a memory unit of the plurality of memory units that is associated with the selected cost.

9. The computer system of claim 8, wherein the page placement module is configured to migrate the block of data to the memory unit of the plurality of memory units that is associated with the selected cost by:
  responsive to determining whether the block of data is stored in the memory unit that is associated with the selected cost, migrating the block of memory unit to the memory unit that is associated with the selected cost.

10. The computer system of claim 8, wherein the page placement module is configured to determine the plurality of costs, select the cost, and migrate the block of data in response to one or more of a periodic time span elapsing, receipt of one or more reliability information updates for one or more memory units of the plurality of memory units, or receipt of a frequency of access information update for the block of data.

11. The computer system of claim 8, wherein the page placement module is configured to determine the plurality of costs further based on an architectural vulnerability factor for the block of data, the architectural vulnerability factor comprising an indication of vulnerability of data in the block of data to memory faults.

12. The computer system of claim 8, wherein the page placement module is configured to determine the plurality of costs by evaluating the expression:

$$Cost_{Mi} = \alpha * FIT_{Mi} * AVF[data\_block] - (1-\alpha) * Hotness[data\_block]/latency_{Mi},$$

where:
  $Cost_{Mi}$ comprises the cost of a memory unit $M_i$;
  $FIT_{Mi}$ comprises a failure-in-time rate of the memory unit $M_i$;
  AVF[data_block] comprises an architectural vulnerability factor for the block of data;
  Hotness[data_block] comprises an indication of frequency of access of the block of data;
  Latency comprises latency of access of the memory unit $M_i$; and
  $\alpha$ comprises a tunable trade-off factor that indicates relative importance of performance and reliability.

13. The computer system of claim 12, wherein the page placement module is configured to select the cost of the plurality of costs by selecting the lowest cost of the plurality of costs.

14. The computer system of claim 12, wherein a is associated with a specific computer process.

15. A non-transitory computer-readable medium storing instructions that, when executed by a processor, cause the processor to identify one memory unit, of a plurality of memory units, for storage of a block of data by performing a method comprising:
  generating failure rates for the plurality of memory units by:
    performing a plurality of fault simulations by performing a series of fault simulation iterations, each fault simulation iteration including simulating fault occurrences and error correction, and determining whether error correcting code is not able to correct at least one error,
    determining a time-to-failure value for each fault simulation by determining the number of fault simulation iterations that occur before an error could not be corrected and an amount of time representative of each fault simulation iteration, and
    determining the failure rates based on the time-to-failure values;
  determining, for the block of data, a plurality of costs, each cost corresponding to a different memory unit of the plurality of memory units, wherein each determined cost is based on a tradeoff between reliability of a corresponding memory unit of the plurality of memory units and performance of the corresponding memory unit based on a comparison of the determined failure rates of the memory units to a combination of hotness values that indicate frequency of access of the block of data and latencies of the memory units;
  selecting a cost of the plurality of costs, the selected cost being either the highest of the plurality of costs or the lowest of the plurality of costs; and
  migrating the block of data to a memory unit of the plurality of memory units that is associated with the selected cost.

16. The non-transitory computer-readable medium of claim 15, wherein the migrating comprises:
  responsive to determining that the block of data is not stored in the memory unit that is associated with the selected cost, migrating the block of memory to the memory unit that is associated with the selected cost.

* * * * *